US008433620B2

(12) United States Patent
Futty et al.

(10) Patent No.: US 8,433,620 B2
(45) Date of Patent: Apr. 30, 2013

(54) APPLICATION STORE TASTEMAKER RECOMMENDATIONS

(75) Inventors: Joseph Futty, Sammamish, WA (US); Matthew Graham Dyor, Bellevue, WA (US); Danny Lange, Sammamish, WA (US); Miller T. Abel, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 12/939,971

(22) Filed: Nov. 4, 2010

(65) Prior Publication Data

US 2012/0116905 A1 May 10, 2012

(51) Int. Cl.
*G06Q 30/00* (2006.01)

(52) U.S. Cl.
USPC .......... 705/26.7; 705/27.1; 705/26.1

(58) Field of Classification Search .......... 705/26.7, 705/26.1, 27.1
See application file for complete search history.

(56) References Cited

U.S. PATENT DOCUMENTS

| | | | |
|---|---|---|---|
| 2003/0163399 A1 | 8/2003 | Harper et al. | |
| 2004/0059626 A1 | 3/2004 | Smallwood | |
| 2004/0225577 A1* | 11/2004 | Robinson | 705/26 |
| 2005/0066350 A1* | 3/2005 | Meuleman | 725/10 |
| 2008/0059422 A1* | 3/2008 | Tenni et al. | 707/3 |
| 2008/0208973 A1 | 8/2008 | Hayashi et al. | |
| 2010/0174747 A1 | 7/2010 | Farrell et al. | |
| 2011/0161912 A1* | 6/2011 | Eteminan et al. | 717/101 |
| 2011/0202406 A1* | 8/2011 | Suomela | 705/14.52 |
| 2011/0225291 A1* | 9/2011 | Dobroth et al. | 709/224 |

OTHER PUBLICATIONS

Aranda, et al., "An Online Social Network-based Recommendation System", Department of Computer Science, University of Toronto, 2007, pp. 1-5.
Debnath, et al., "Feature Weighting in Content Based Recommendation System Using Social Network Analysis", WWW 2008, ACM, Apr. 21-25, 2008, Beijing China, Apr. 21-25, 2008, pp. 1041-1042.
He, et al., "A Social Network-Based Recommender Systems (SNRS)", Computer Science Department University of California, Los Angeles, CA, 2009, pp. 1-31.
Seth, "Design of a Social Network Based Recommender System for Participatory Media Content", School of Computer Science, University of Waterloo, ON, Canada, 2008, pp. 1-6.
Webster, "Amazon throws hat into Android app store ring," CNET.com, Sep. 29, 2010 3:53 PM PDT retrieved on Sep. 30, 2010 from <<http://www.cnet.com/8301-19736_1-20018078-251.html>>, 3 pages.
Webster, et al., "Push-Poll Recommender System: Supporting Word of Mouth", Department of Computer Science, University of Saskatchewan, CN, Springer-Verlag Berlin Heidelberg, 2007, pp. 288-297.

* cited by examiner

*Primary Examiner* — Courtney Stopp
(74) *Attorney, Agent, or Firm* — Lee & Hayes, PLLC

(57) ABSTRACT

An application store tastemaker recommendation service is usable to determine experts within a user's social network(s), receive recommendations from the experts, and filter and/or rank mobile application query results based at least in part on the recommendations. Additionally, the service may be usable to determine experts based on data compiled about previous actions, reviews, comments, etc., of the experts. Further, the service may be usable to provide recommendations to the user to aid in selecting mobile applications for purchase, and may provide an avenue for completing such purchases.

20 Claims, 5 Drawing Sheets

APPLICATION STORE TASTEMAKER RECOMMENDATIONS

BACKGROUND

When mobile communication devices first became available to the general public they had very limited functionality. For example, the first devices merely transmitted text or voice signals. However, as technology has advanced, such devices have followed suit. Additionally, and somewhat in parallel, the number of mobile device applications has been rapidly growing since the inception of the first personal digital assistant (PDA). For example, at first, PDAs were simply used to manage contacts, to-do collections, and calendars; however, eventually they grew to provide nearly unlimited functionality as the number of applications grew.

Today, modern mobile devices, including cell phones, resemble advanced PDAs with voice, text, and/or data transmissions, as well as numerous applications for doing just about anything one could imagine. Thus, in today's world of ever-increasing mobility, it is no surprise that there are literally hundreds of thousands of mobile device applications. For example, one mobile device application provider touts that they offer over two hundred thousand applications for a single device.

As such, mobile device users may be overwhelmed when searching for applications for their devices. For example, if a user begins a search for a document reader application, they may find over fifty results, many of which have excellent, and similar, ratings. As such, finding mobile device applications may be confusing and time consuming. Unfortunately, current systems are not equipped to help users easily track down the best applications in an easy and efficient manner.

BRIEF SUMMARY

This summary is provided to introduce simplified concepts for an application store tastemaker recommendation service, which is further described below in the Detailed Description. This summary is not intended to identify essential features of the claimed subject matter, nor is it intended for use in determining the scope of the claimed subject matter. Generally, the application store tastemaker recommendation service described herein involves using a central location to filter and rank mobile application query results based on tastemaker recommendations. As used herein, the term "tastemaker" may refer to an expert or a perceived expert with relation to an application or a genre of applications, including mobile applications. Tastemakers may, but need not necessarily, be friends, social acquaintances, or other members of a user's social network. In one aspect, the server may leverage viral marketing by helping applications gain credibility among potential purchasers through recommendations from social acquaintances and/or based on social acquaintances' usage.

In one aspect, an application store tastemaker recommendation service may receive a request for information pertaining to an application or a type of application. The service may discover available applications related to the requested application by performing a search. The service may also determine a tastemaker with respect to the available applications and collect data and/or recommendations from the tastemaker. Further, the service may filter and/or rank the search results based on the collected data, and may display the filtered and/or ranked search results upon receiving an indication that a search is complete and/or to repeat the filtering and/or ranking.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
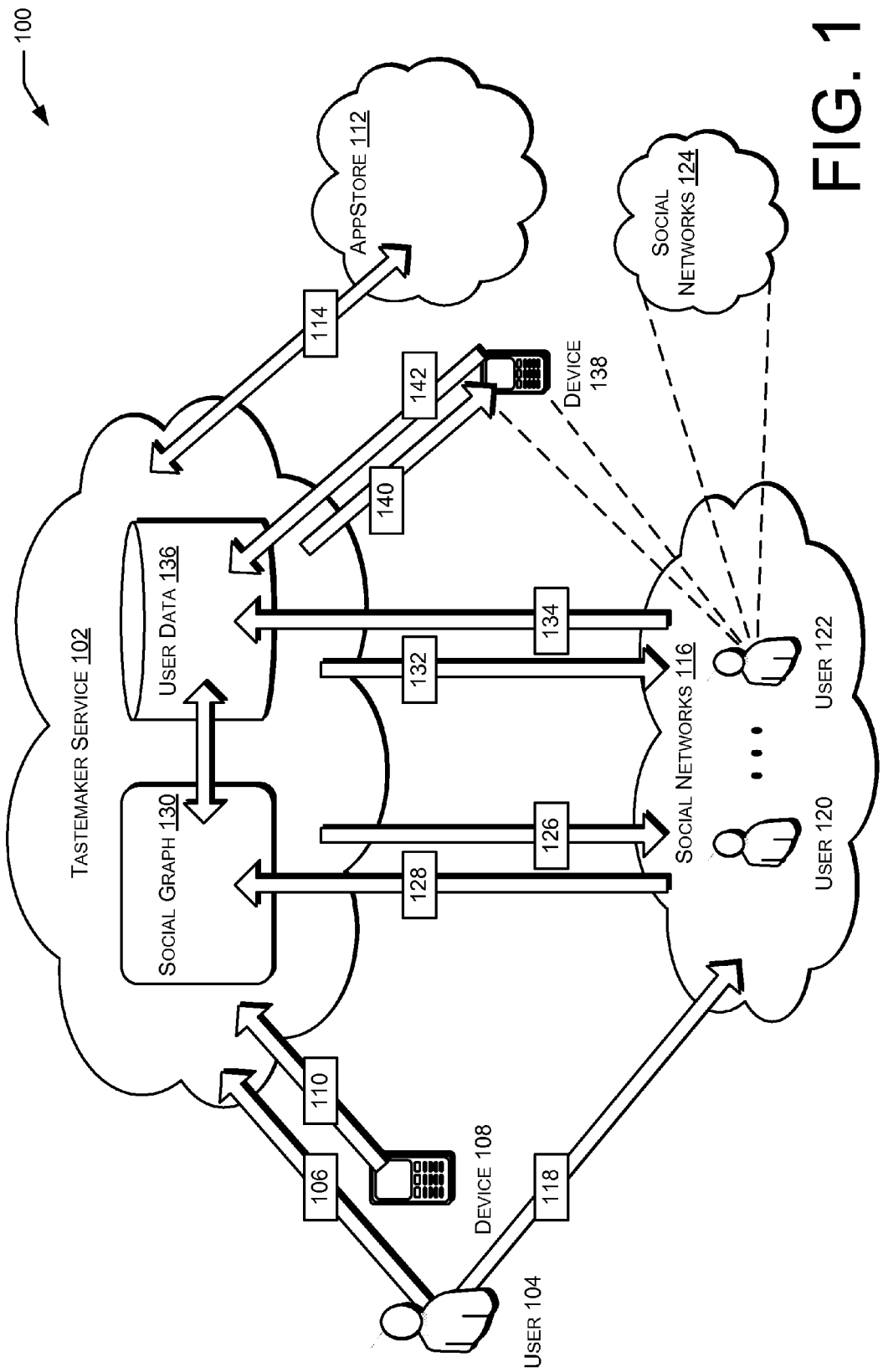
FIG. 1 is a schematic diagram of an illustrative system for implementing an application store tastemaker recommendation service.

This disclosure is directed, in part, to techniques for implementing an application store tastemaker recommendation service. This disclosure is also related to providing a simple way for mobile device users to navigate overwhelmingly large mobile and non-mobile application query results. In addition, this disclosure is also related to leveraging viral marketing to help mobile applications gain credibility through usage information and/or social acquaintances' recommendations. Techniques for creating a social graph made up of a multitude of social acquaintances found within one's social networks are also disclosed. Additionally, techniques for determining experts among one's social graph and harnessing their expertise and comments are also disclosed. As such, the techniques may allow a mobile device user to determine which mobile applications are best for their needs based on reviews, comments, blog entries, likes, dislikes, and/or practices of those users within their social graph. Additionally, the techniques may provide a method for keeping track of which social acquaintances in one's social graph are tastemakers for specific mobile applications, mobile application genres, and/or mobile devices. Further, as used herein, the term social network is used to describe one's circle of social acquaintances (e.g., people whose contact information is stored within one's digital contact collection, email collection, and/or social networking website collection, etc.), and, as such, is not limited to any particular social network.

In one aspect, a social graph may be made up of interconnected nodes, with a root node (or other centralized type of node) representing a user and each other node representing a social acquaintance found within the user's social circle. In other words, social acquaintances of a user, or of a user's social acquaintances, may be represented by nodes within the user's social graph at differing distances (i.e., differing numbers of nodes away) from the user node. For example, direct social acquaintances (e.g., those within the user's circle of social acquaintances) may be represented as acquaintance nodes that share a single edge with the user node. Additionally, indirect social acquaintances (e.g., social acquaintances of social acquaintances) may be represented as nodes that share a single edge with acquaintance nodes, rather than with the user node.

In one instance, a user may wish to install new mobile applications on a mobile device. In this example, a user may wish to find a document reader that is compatible with the mobile device they use, and with the documents stored thereon. Upon searching for mobile document readers, the user may be presented with an overwhelming number of results. Additionally, however, in one example, the user may be able to sign-in to an application store or tastemaker recommendation service that can help filter the results based on data collected from those in the user's social graph. In one example, where the service collects user data, the service will provide opt-in and/or opt-out functionality. For example, in one instance, prior to any user information being collected and/or shared, the user whose information is to be collected will be notified and given the option to opt-out. Further, in one aspect, enhanced security measures will be employed in order to protect the user and/or application data.

For example, the application store may be configured to determine what mobile devices and mobile applications are being, or have been, used by the user's social acquaintances. In one example, the service may be configured to operate in a cloud. In other examples, however, the service could be hosted on a server, a server farm, or other server-type implementation instead of, or in combination with, the cloud. Throughout this disclosure, references to the "cloud" may include any or all of the above implementation examples. Additionally, the application store or tastemaker recommendation service may also be configured to receive and organize recommendation information about document reader applications from the user's social acquaintances. This recommendation information may be based on application reviews, answered polls, blog posts, whether the social acquaintance installed and/or uninstalled the same or similar applications, whether the social acquaintance is considered a tastemaker, whether the social acquaintance has social acquaintances who are considered tastemakers, combinations of the foregoing, or the like.

As such, the application store may be able to help the user choose the best document reader application by filtering and/or ranking the query results based on the recommendation information. In one example, the user may choose to filter the results by removing from the results all applications that none of his social acquaintances have installed. In another example, the user may choose to filter the results by removing all applications that any of his social acquaintances have ever uninstalled. In yet another example, the user may wish to rank the results, with or without filtering them first, based on reviews or blog posts written by social acquaintances that are considered tastemakers. By way of example only, similar to filtering out applications that the user's social acquaintances have uninstalled, the user make rank or score more negatively applications that their social acquaintances have uninstalled as opposed to applications that were never installed or never uninstalled. Additionally, in yet another example, the user may create a poll to ask his social acquaintances for help regarding the query results. Those that answer may provide valuable recommendation information that can be used for filtering and/or ranking of the results and/or results of future searches by the same or different users. In addition, those who answer may increase their own tastemaker status within the system. Further, while several examples of filtering and/or ranking query results based on recommendations are described above, any number of combinations of the foregoing examples or combinations of any of the afore-mentioned types of recommendation information may be implemented.

In one aspect, a tastemaker may be declared by the user as a social acquaintance whom the user trusts as an expert based on personal knowledge about the social acquaintance. However, tastemaker status may also be conferred automatically by the application service and may be based on quantity and/or quality of a social acquaintance's participation with the service. In other words, the more reviews, blog posts, poll answers, and the like, that the social acquaintance submits, the higher that social acquaintance's tastemaker status may be. Additionally, the more success a social acquaintance has with their recommendations, the higher that social acquaintance's tastemaker status may be as well. Further, tastemaker status may be increased or decreased with respect other users who follow the tastemaker's recommendations based on feedback from those other users. That is, a tastemaker's status may decrease with respect to a user if that user reports that the tastemaker's recommendation was poor. In one example, a tastemaker may have social acquaintances who they consider tastemakers. These second level tastemakers, as well as their tastemakers (third level tastemakers) may be accessible by the user as well. In this way, each user may be able to receive information from any $n^{th}$ level tastemaker; where n is an integer greater than zero, within their own and/or their social acquaintance's social graphs.

FIG. 1 depicts an illustrative example 100 of an application store tastemaker recommendation service 102 that may operate as an in-cloud service. By way of example only, a user 104 may interact with the tastemaker service 102 directly, seen as arrow 106, or via a device 108, seen as arrow 110 to, among other things, perform mobile application queries. Interactions 106 and/or 110 may be wired or wireless network connections or combinations thereof. In one example, the device 108 may be a cellular device, or other handheld mobile device capable of installing and/or running mobile applications or the like. Additionally, by way of example, the user 104 may interact with the service 102 directly, arrow 106, via a Web browser or other way of accessing the service 102, such as over a public network like the Internet. In one example, the service 102 may be integrated with an application store (hereinafter, "AppStore") for searching, purchasing, and/or downloading mobile applications such that the service 102 may be a service of an AppStore or vice versa. However, in other examples, the service 102 may interface with a remote AppStore 112, seen as arrow 114, or the service 102 may be a service of an AppStore that also interfaces with remote AppStores like AppStore 112. In any case, the service 102 may be configured to access mobile applications and associated data from one or more different AppStores regardless of the location of the AppStore. Additionally, AppStores may maintain application data with respect to user 104 and/or their social acquaintances. For example, AppStore 112 may maintain information about what applications have been installed on and/or uninstalled from the devices of user 104, the devices of their social acquaintances, and/or the devices of the social acquaintances of the user's 104 social acquaintances.

Further, the user 104 may also interact with one or more applications that represent the social networks 116 of the user 104, seen as arrow 118. As discussed above, and by way of example only, social networks 116 may include data about social acquaintances found in any combination of a user's Web-based social networking sites, email applications, contact collections, and the like. For example, a user 120 may be a social acquaintance of the user 104 and may also be a contact on Facebook® or other social networking site. Additionally, a user 122 may be a social acquaintance of the user 104 and may also be a Microsoft® Office Outlook® email contact. As such, both user 120 and user 122 may be part of the social networks 116 of user 104. In one aspect, any person whom user 104 can contact digitally, whether by the Internet, cellular network, private network connection, or the like, may be considered part of the user's 104 social networks 116.

While only two users 120 and 122 are shown here in social networks 116, any number of users may exist depending on how many social acquaintances the user 104 has, or how many social acquaintances the user 122 has in social networks 116.

In one aspect, the tastemaker service 102 may interact with the social networks 116 of the user 104, seen as arrows 126 and 128. For example, arrow 126 may represent that the service 102 may actively crawl the social networks 116 of the user 104 and arrow 128 may represent that the data received in response to the crawling may be compiled to make a social graph 130. Additionally, arrow 128 may represent data being sent to the social graph 130 of service 102 as a feed (e.g., Really Simple Syndication (RSS) or other type of news feed) to which service 102 may subscribe. In other words, social graph 130 may represent the combined user information of each social acquaintance of user 104 found within the social networks 116. The data received, and stored in the social graph 130, may include information about what mobile applications the social acquaintances have installed and/or uninstalled on their own mobile devices. In one example, the social graph 130 may be stored in the cloud for each individual session of the user 104 or it may be stored in the cloud for future use, in which case it may grow and change over time as the social networks 116 of the user 104 grow and change. Additionally, the tastemaker service 102 may utilize the social graph 130 to help the user 104 filter and/or rank mobile application queries.

In addition, in one aspect, the tastemaker service 102 may crawl the social networks 116, seen as arrow 132, or the social graph 130 to determine whether a social acquaintance is a tastemaker. In other words, in response to crawls of the social networks 116, or social the graph 130, information pertaining to recommendations, answered polls, application reviews, and the like may be transmitted, seen as arrow 134, to user data storage 136. The user data storage 136 may store the user data in the cloud for the tastemaker service 102 such that it can be aggregated and reviewed to aid in the filtering and ranking of application queries of the user 104. In some examples, the social graph 130 and the user data storage 136 may communicate with one another so the data can be shared. However, in other examples, the user data may be stored in the social graph 130 alone.

By way of example only, user 122 may also operate a mobile device 138. In one aspect, the tastemaker service 102 may crawl an application store such as AppStore 112 to determine what applications have been installed and/or uninstalled on the mobile device 138. Alternatively, or additionally, the tastemaker service 102 may crawl the mobile device 138, seen as arrow 140, for applications that have been installed and/or uninstalled on the mobile device 138. The tastemaker service 102 may use this information to help the user 104 filter and/or rank the application query results. While arrow 142 shows this data being transmitted to the user data storage 136, as mentioned above, this information may also be transmitted and stored directly to the social graph 130.

FIG. 1 provides a simplified example 100 for implementing an application store tastemaker recommendation service according to the present disclosure. However, other configurations are also possible. For example, and as described above, the social networks 116 may include more than two users, the service 102 may be in communication with more than one App Store 112, and/or an AppStore may be integrated within the service 102. Additionally, while only one user 122 is shown with its own social networks 124, any social acquaintance within social networks 116 may have their own social networks, and so on.

Illustrative Architectures

Figure 2:
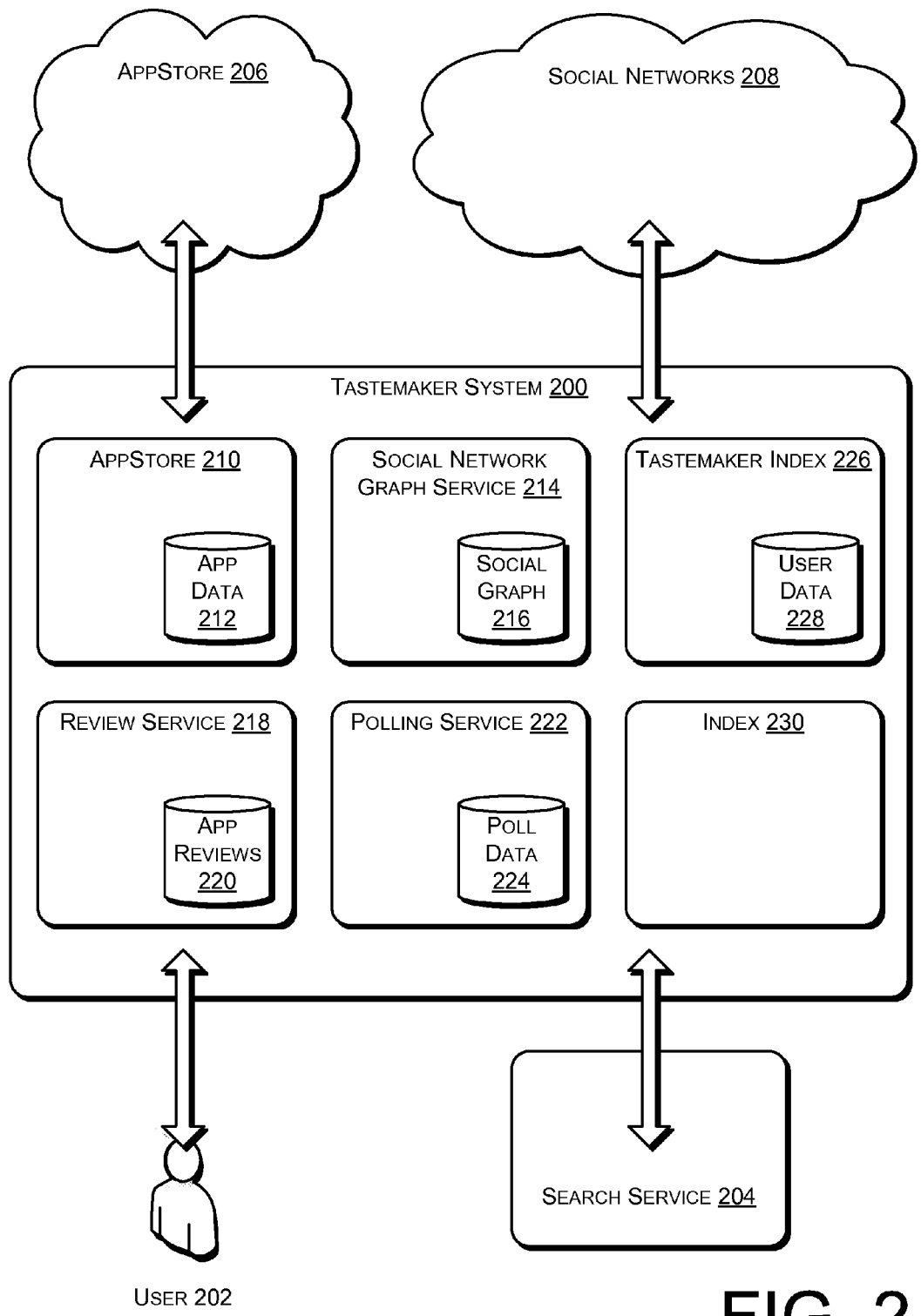
FIG. 2 is a schematic diagram illustrating details of an illustrative system for implementing an application store tastemaker recommendation service.

FIG. 2 depicts an illustrative application store tastemaker recommendation system 200 similar to service 102 of FIG. 1. In one aspect, a user 202 may interact with the application store tastemaker recommendation system 200 to provide application query results and to aid with filtering and/or ranking those results. As such, the application store tastemaker recommendation system 200 may be accessible by the user 202 via a network connection such as the Internet, a cellular service, or the like. In one aspect, the tastemaker system 200 may sit on top of a search service 204. For example, the search service 204 may implement searching one or more remote AppStores 206 or social networks 208. However, in other examples, the search service 204 may be integrated within the tastemaker system 200 such that system 200 may implement searching on its own. As discussed above with respect to FIG. 1, AppStore 206 may be remote, or local, repositories of mobile application data. That is, AppStore 206 may maintain information about applications that are available for download and/or purchase as well as information about what applications have been installed on and/or uninstalled from particular devices. In this way, the tastemaker system 200 may, in one example, make recommendations, filter and/or rank results, and/or identify tastemakers based on information procured from AppStore 206 without requesting information from user 202, other users, or their respective devices.

Additionally, as discussed above, social networks 208 may be any type of application or service that facilitates the connection of social acquaintances. In one aspect, social networks 208 includes each social acquaintance of user 202 that may be contacted via digital means such that they can be queried for reviews, comments, recommendations, and/or answers to poll questions. As discussed above, the tastemaker system 200 may crawl AppStore 206 and/or social networks 208 for information to aid in the filtering and/or ranking of mobile application queries.

In one aspect, the tastemaker system 200 may also include an integrated AppStore 210 or it may be a function of AppStore 210. In other words, the tastemaker system 200 may be a service provided by AppStore 210. However, in this case, the tastemaker system 200 may still be able to crawl other AppStores, such as, but not limited to, AppStore 206. In one example, the AppStore 210 may store data about local or previously crawled mobile applications in app data storage 212. When a user performs an application query, the collection of available mobile applications may be determined based on the data stored in the app data storage 212, whether the data was local or found during a crawl of a remote AppStore 206. Additionally, the tastemaker system 200 may also include a social network graph service 214 for creating a social graph as described above with respect to FIG. 1. In one example, the social graph 130 may compile information from receiving feeds or crawling the social networks 208 and/or the devices of the user's 202 social acquaintances. The social graph 130 may then store the information in social graph storage 216. As discussed above, this information may be used to help filter and rank mobile application queries such that the tastemaker system 200 may aid the user 202 in selecting a mobile application for purchase.

In one aspect, the tastemaker system 200 may include a review service 218 for receiving and storing mobile application reviews in application reviews storage 220. By way of example only, the review service 218 may be configured to receive reviews from social acquaintances of user 202, tastemakers known throughout the system, and/or social acquaintances of social acquaintances. Additionally, in some examples, the review service 218 may provide a platform for social acquaintances, or other tastemakers, to write reviews, a platform for user 202 to request a review of an application from a social acquaintance or other known tastemaker, or a platform for others to provide reviews of a tastemaker's previous recommendation. In this way, a tastemaker's status may be challenged, or decreased, based on reviewers commenting that the advice was poor. Alternatively, a tastemaker's status may be increased by good reviews of the recommendation (i.e., explicit feedback) or by a notification that others followed the recommendation and installed, or didn't uninstall, the recommended application (i.e., implicit feedback).

Additionally, the tastemaker system 200 may include a polling service 222 for storing poll questions and their results in poll data storage 224. By way of example only, and similar to the review service 218, the polling service 222 may be configured to receive answered polls from social acquaintances of user 202, tastemakers known throughout the system, and/or social acquaintances of social acquaintances. Additionally, the polling service 222 may be configured to provide a platform for user 202 to write poll questions for answering questions about a mobile application being researched. In this way, if the user 202 is interested in having a specific question answered, they may draft a poll via the polling service 222. The polling service 222 may provide this poll to all the user's 202 social acquaintances, to only specific social acquaintances, to only tastemakers, any combination of the foregoing, or the like. Additionally, the poll may be presented to the public and the responses may be weighted based on the tastemaker status of the responders. In one aspect, the polling service 222 may provide an answered poll for public access. In other words, the poll may be searched by the search service 204, or any public search engine. As such, other users may be able to read the poll even if they are not accessing the tastemaker system 200.

The tastemaker system 200 may also include a tastemaker index 226 for storing information about which social acquaintances, or social acquaintances of social acquaintances, are tastemakers. The tastemaker index 226 may store the information in user data storage 228. This information may be used, along with the application reviews 220 and poll data 224, to help the user 202 filter and rank their application query results. As discussed above, however, the user data 228 may also include the application reviews 220 and the poll data 224. That is, the application reviews 220 and the poll data 224 may in fact be user data 228. Thus, the data may be managed by the different services 218 and 222, but with pointers from the user data storage 228, or it may be managed in one central location, such as user data storage 228.

Further, the tastemaker system 200 may also include an index 230 for storing the results of crawling the AppStore 206. This index may be particularly useful when the tastemaker system 200 does not include AppStore 210. That is, the index 230 may be used to index the mobile applications that are discovered during a crawl of a remote AppStore 210 such that the tastemaker system 200 does not have to host the applications themselves. In this way, the tastemaker system 200 may be able to keep track of available mobile applications that reside on other systems or, in particular, in other AppStores. In addition, the index 230 may be able to differentiate between mobile applications that are compatible with different mobile devices and/or different operating systems. For example, the index 230 may be able to store information about a single document reader that runs on multiple different operating systems. In this way, the tastemaker system 200 may be able to filter the application query results for the user 202 based on a type of mobile device and/or operating system.

Similarly, the review service 218 and the polling service 222 may be capable of sorting their reviews and polls in the same way.

FIG. 2 provides a simplified example of a suitable tastemaker system 200 according to the present disclosure. However, other configurations are also possible. For example, and as described above, the social networks 208 may be made up of multiple different social acquaintances from multiple different sources and the system 200 may be in communication with more than one App Store 206.

Illustrative Application Store Tastemaker Recommendation Processes

Figure 3:
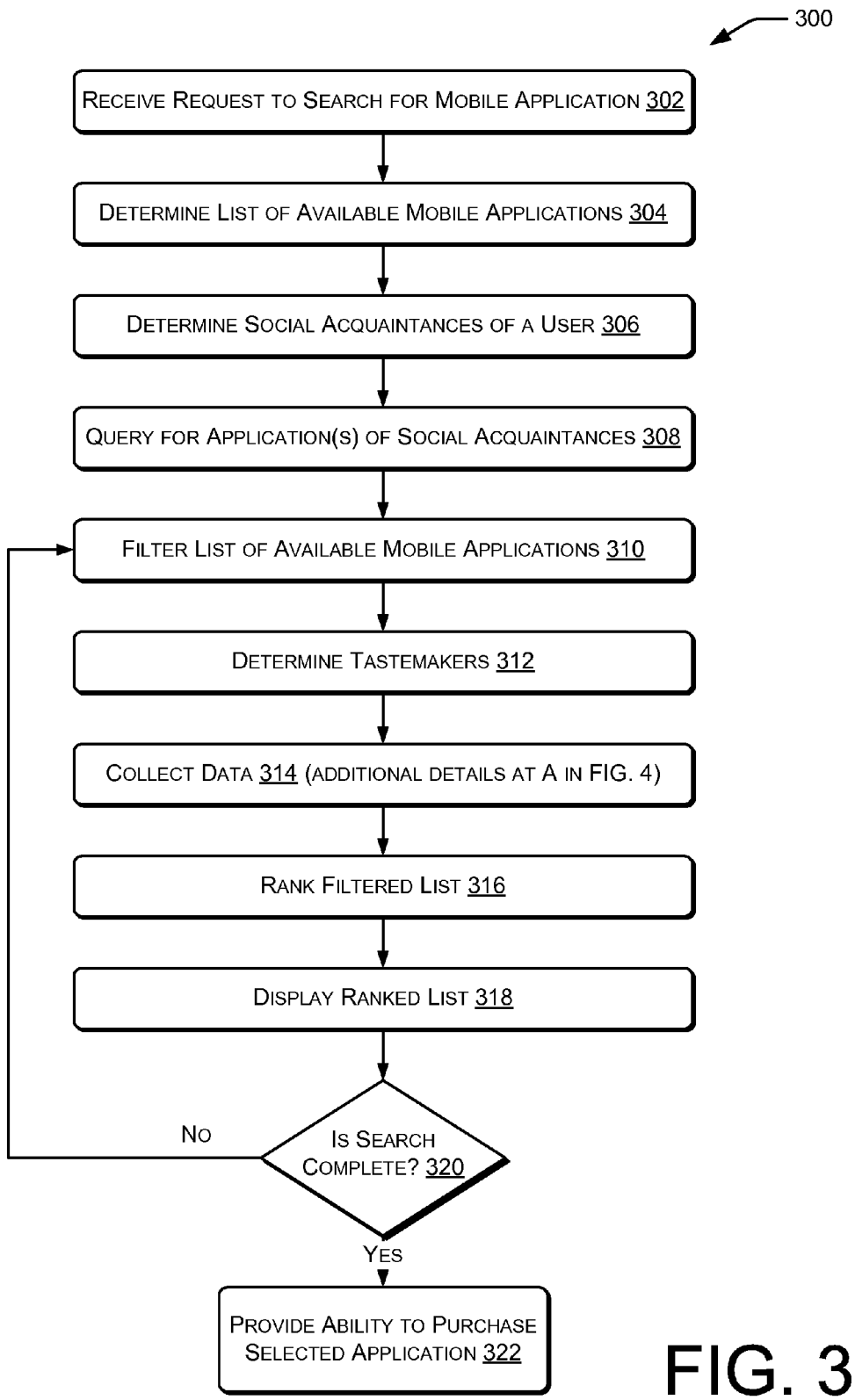
FIGS. 3 and 4 are flowcharts illustrating details of a method for implementing an application store tastemaker recommendation service.
Figure 4:
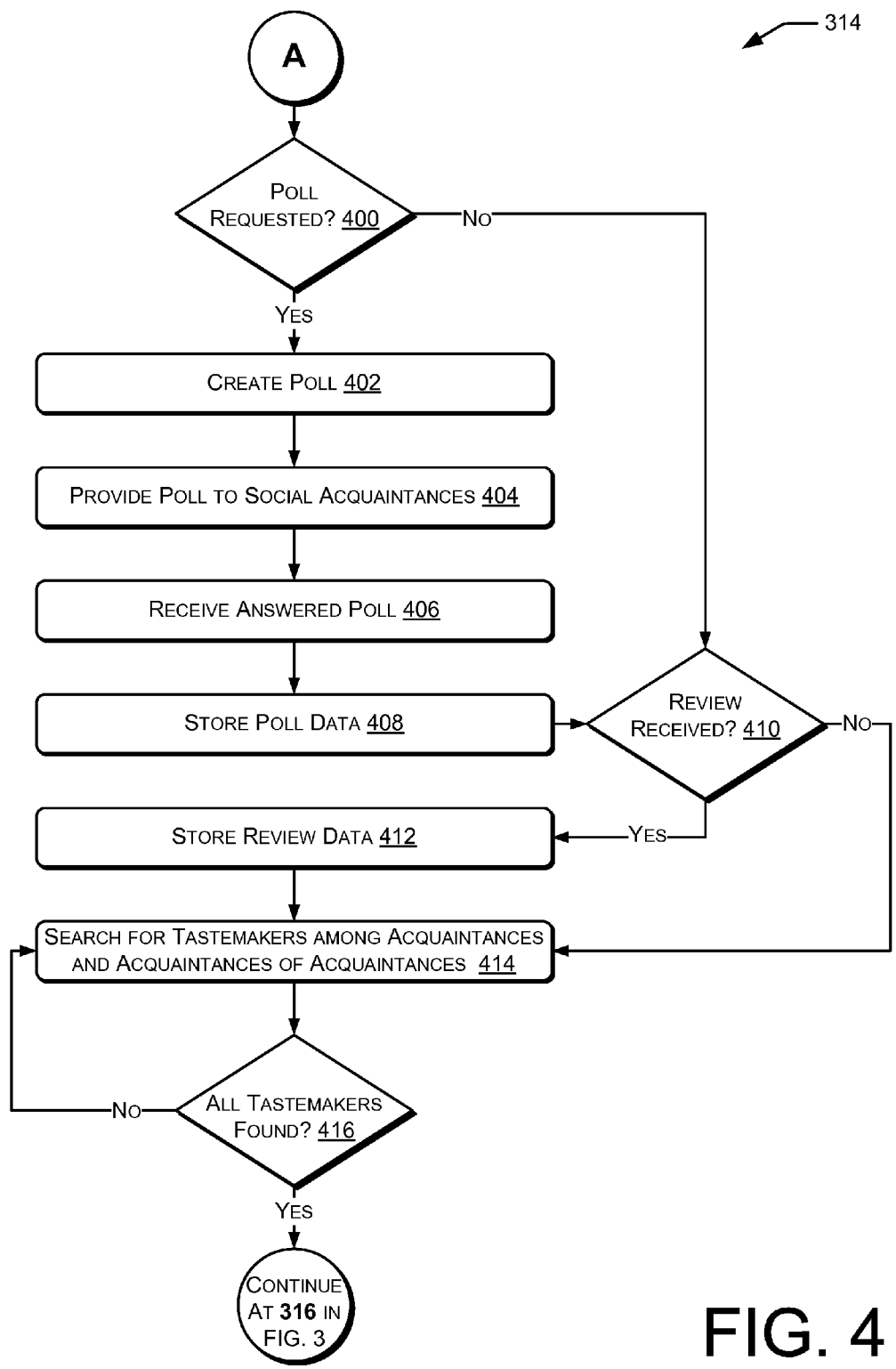

FIGS. 3 and 4 are flow diagrams of one illustrative process 300 for implementing an application store tastemaker recommendation service as described with reference to FIGS. 1 and 2. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIGS. 3 and 4 illustrate an example flow diagram of process 300 for implementing an application store tastemaker recommendation service that may be responsible for interacting with a user to help them search for mobile applications and/or filter, rank, and/or select mobile applications from search results or other collections, as discussed above.

In this particular implementation, the process 300 may begin at block 302 of FIG. 3 in which the process 300 may receive a request to search for mobile applications, for example, from within an AppStore. In other aspects, however, a collection of mobile applications may be presented to a user or determined for a user without receiving the request. For example, a collection of popular mobile applications may be presented to a user based on a recommendation, blog post, consumer review, or the like. At block 304, the process 300 may determine a collection of available mobile applications. As discussed above, the process 300 may determine the collection of applications in response to receiving the request at block 302. Additionally, the collection of applications may include applications found within a single AppStore, an index of previously searched applications, or a multitude of different AppStores, combinations of the foregoing, or the like.

In one aspect, the process 300 may determine social acquaintances of a user at block 306. This determination may include searching a user's social networks, searching an already created social graph of the user, or both. As discussed above, these social acquaintances may be anyone of which the user has digital contact information. At block 308, the process 300 may query an application store or one or more devices of a person determined to be a social acquaintance of the user for one or more applications that have been installed and/or uninstalled on that person's device. In other words, the process 300 may query an application store account of or a device of a user's social acquaintance to determine what mobile applications the social acquaintance has installed and/or uninstalled on their device. In one example, this information may be used to determine a recommendation for mobile applications and/or for filtering and/or ranking a mobile application collection. At block 310, the process 300 may filter the collection of available mobile applications that was determined at block 304. However, in other examples, the process 300 may filter a different collection. Additionally, as discussed above, the filtering may be based on the query performed at block 308, such that a user may choose to only view applications from the collection that have been installed by their social acquaintances.

The process 300 may determine tastemakers from the collection of social acquaintances at block 312. In one aspect, tastemakers may be determined based on what applications they (the user's social acquaintances) have installed, uninstalled, written reviews about, answered polls about, etc. At block 314, the process 300 may collect the reviews, poll answers, etc., from the tastemakers. The process 300 may proceed to rank the filtered collection at block 316. Similar to filtering the collection at block 310, and by way of example only, the collection of available mobile applications may be ranked based on the information acquired regarding reviews, polls, blog entries, likes and dislikes of others, etc. In one aspect, ranking the collection at block 316 includes changing the order of the collection without removing entries in the collection. On the other hand, filtering the collection at block 310 may include removing entries from the collection. However, in another aspect, filtering may include re-ordering the collection without removing entries, and ranking may include removing entries.

At block 318, the process 300 may display the ranked and/or filtered collection to the user to aid in making a decision. At decision block 320, the process 300 may determine whether the search is complete. In one aspect, this determination may be based on querying the user about whether they are finished searching. In another aspect, this determination may be made based on the user indicating, without first being queried, that the search is complete. In yet another aspect, the process 300 may determine implicitly that the search is complete based on the user logging-out of the AppStore, or otherwise terminating their on-line session, or based on the size of the remaining collection. For example, if the query results have been filtered to where there is only one result remaining, the process 300 may imply that the search is complete. Additionally, the user may select a query results size of a number of entries, and the process may determine that the search is complete when the results collection reaches the selected size. If the process 300 determines, at decision block 320, that the search is not complete, the process may return to block 310 for further filtering, ranking, polling, reviewing, and/or tastemaker discovering. On the other hand, if the search is complete at decision block 318, the process 300 may terminate by providing the ability to purchase a selected mobile application at block 322.

FIG. 4, in one instance, describes additional details of data collection process 314 as seen at block 314 of FIG. 3. At decision block 400, the process 314 may determine whether a poll was requested by a user. If, at decision block 400, the process 314 determines that a poll was requested, the process 314 may create, or allow a user to create, a poll at block 402. The poll may be designed to ask a question about mobile applications, or other types of applications, in general, about a particular mobile application, about a set of mobile applications, about a type of mobile application, or about any application. In one aspect, the poll may be a yes/no type of poll; however, in another aspect the poll may be a multiple-choice type poll. At block 404, the process 314 may provide the poll to the user's social acquaintances. While, in one aspect, the process 314 may only provide the poll to tastemakers within the user's social networks, or social graph, in another aspect, the process 314 may be configured to provide the poll to social acquaintances of social acquaintances, or even to the public. At block 406, the process 314 may receive the answered poll and, at block 408, the process 314 may store the poll data. As noted above, in one aspect, the process 314 may store the poll data such that it is publicly accessible and searchable over a public network such as the Internet.

The process 314 may further determine, at decision block 410, whether a mobile application review has been received. Alternatively, if no poll was requested at decision block 400, the process may proceed directly to decision block 410 without processing the poll at all. If the process 314 determines at decision block 410 that a review was received, the process 314 may store the review data at block 412 and then search for tastemakers among social acquaintances, and/or social acquaintances of social acquaintances at block 414. On the other hand, if no review was received at decision block 410, the process 314 may proceed directly to block 414. Searching for tastemakers among a user's social acquaintances, and/or social acquaintances of social acquaintances, may include searching the user's social graph for answered polls, written reviews, and followed recommendations. In one aspect, searching for tastemakers may also, or alternatively, include processing feedback information about whether other users followed or agreed with the tastemakers.

At decision block 416, the process 314 may determine if every tastemaker within a user's social graph, or social networks, has been discovered. If not, the process 314 may continue to search for more tastemakers at block 414. Alternatively, however, if the process determines that every tastemaker has been discovered, or if the user indicates that enough tastemakers have been found, the process 314 may then proceed to block 316 in FIG. 3 for further processing.

Illustrative Computing Environment

Figure 5:
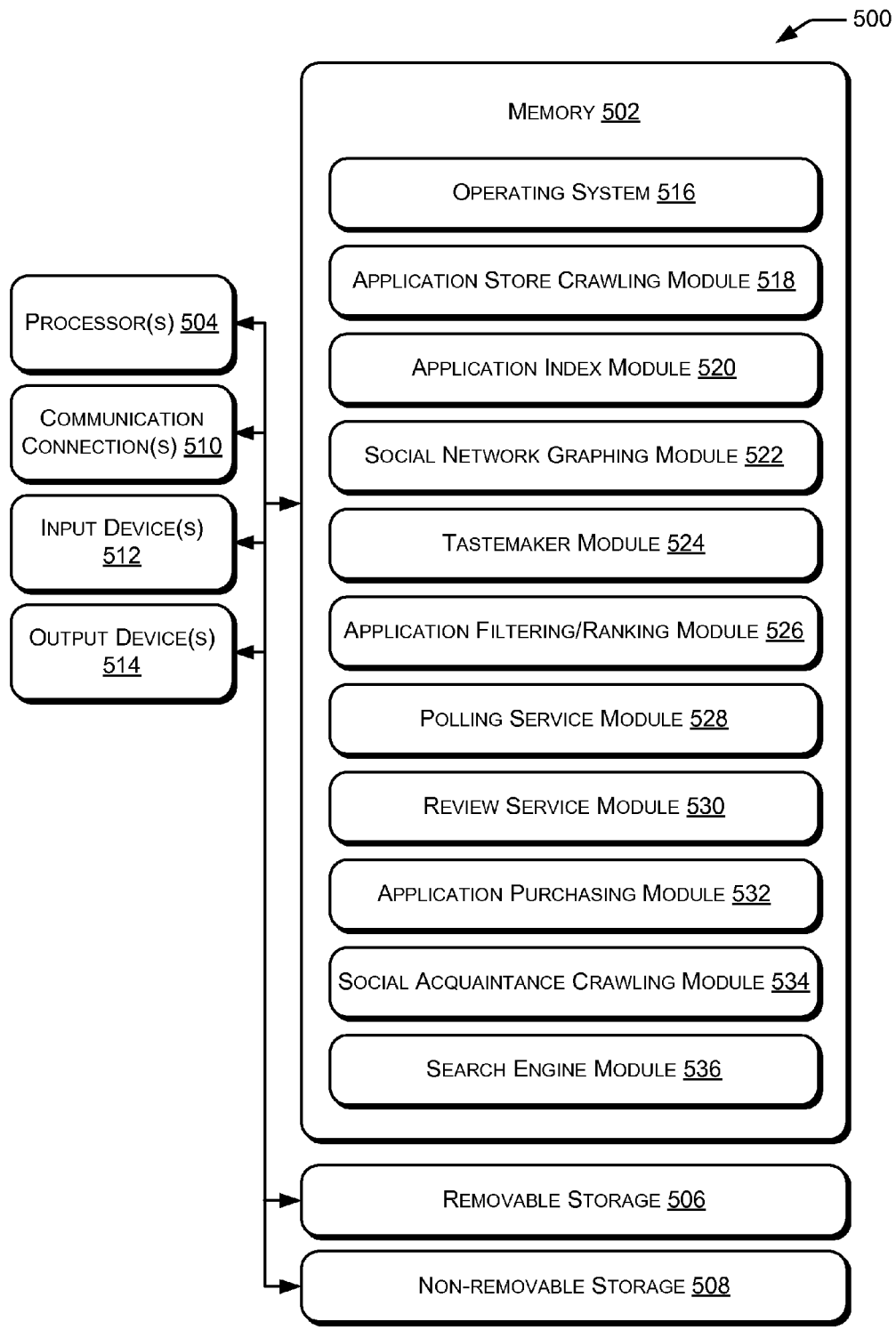
FIG. 5 is a block diagram of a computer environment showing an illustrative system in which an application store tastemaker recommendation service may be implemented.

FIG. 5 provides an illustrative overview of one computing environment 500, in which aspects and features disclosed herein may be implemented. The computing environment 500 may be configured as any suitable computing device capable of implementing an application store tastemaker recommendation service, and accompanying methods, such as, but not limited to those described with reference to FIGS. 1-4. By way of example and not limitation, suitable computing devices may include personal computers (PCs), servers, server farms, datacenters, or any other device capable of storing and executing all or part of the migration service.

In one illustrative configuration, the computing environment 500 comprises at least a memory 502 and one or more processing units (or processor(s)) 504. The processor(s) 504 may be implemented as appropriate in hardware, software, firmware, or combinations thereof. Software or firmware implementations of the processor(s) 504 may include computer-executable or machine-executable instructions written in any suitable programming language to perform the various functions described.

Memory 502 may store program instructions that are loadable and executable on the processor(s) 504, as well as data generated during the execution of these programs. Depending on the configuration and type of computing device, memory 502 may be volatile (such as random access memory (RAM)) and/or non-volatile (such as read-only memory (ROM), flash memory, etc.). The computing device or server may also include additional removable storage 506 and/or non-removable storage 508 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 502 may include multiple different types of memory, such as static random access memory (SRAM), dynamic random access memory (DRAM), or ROM.

Memory 502, removable storage 506, and non-removable storage 508 are all examples of computer-readable storage media. Computer-readable storage media includes, but is not limited to, volatile and non-volatile, removable and non-removable media implemented in any method or technology for storage of information such as computer-readable instructions, data structures, program modules or other data. Memory 502, removable storage 506, and non-removable storage 508 are all examples of computer storage media. Additional types of computer storage media that may be present include, but are not limited to, phase change memory (PRAM), SRAM, DRAM, other types of RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server or other computing device. Combinations of any of the above may also be included within the scope of computer-readable storage media.

The computing environment 500 may also contain communications connection(s) 510 that allow the computing environment 500 to communicate with a stored database, another computing device or server, user terminals, and/or other devices on a network. The computing environment 500 may also include input device(s) 512 such as a keyboard, mouse, pen, voice input device, touch input device, etc., and output device(s) 514, such as a display, speakers, printer, etc.

Turning to the contents of the memory 502 in more detail, the memory 502 may include an operating system 516 and one or more application programs or services for implementing an application store tastemaker recommendation service including an AppStore crawling module 518. The AppStore crawling module may be configured to crawl one or more AppStores, whether local or remote, for available mobile applications that may purchased and/or downloaded. In one aspect the crawling may be in response to a user's query. Additionally, in one aspect, the results of this crawling may be further manipulated by other modules stored in the memory 502. Further, the AppStore crawling module 518 may also be configured to crawl one or more AppStores for information pertaining to which applications have been installed and/or uninstalled on which devices.

The memory 502 may further include an application index module 520. The application index module 520 may be configured to store results from the AppStore crawling module 518. In this way, a local collection of available mobile applications may be maintained in the memory 502 without requiring the computing environment 500 to host all of the available applications.

Additionally, the memory 502 may also include a social network graphing module 522 for crawling a user's social networks and creating a social graph. As discussed above, the social graph may contain information about the social acquaintances of the user including, but not limited to, what types of applications they have installed and/or uninstalled on their own mobile devices.

The memory 502 may further include a tastemaker module 524. The tastemaker module 524 may be configured to determine which social acquaintances of the user, or social acquaintances of the user's social acquaintances, are tastemakers. In addition, the tastemaker module 524 may be configured to rank tastemakers, maintain tastemaker status information, and review information about the tastemakers provided by others.

In addition, the memory 502 may also include an application filtering/ranking module 526. The application filtering/ranking module 526 may be configured to filter and/or rank a user's query results based on information gathered by other modules stored in the memory 502. By way of example only, the application filtering/ranking module 526 may provide a user interface (UI) to the user for implementing the ranking and/or filtering.

The memory 502 may further include a polling service module 528 and a review service module 530. As discussed in detail above, these two modules may be configured for providing and/or receiving polls and/or reviews related to mobile applications. In some aspects, the polls and/or reviews may be related to available mobile application found in a user's query results after crawling AppStores. However, in other aspects, the polls and/or reviews may be related to any available application, in which case, the computing environment 500 may store the reviews and/or polls in the memory 502 for later use.

Additionally, the memory 502 may include an application purchasing module 532 configured to provide a user with the ability to purchase one or more of the mobile applications being researched. In one aspect, the user may purchase mobile applications that are being sold by a local AppStore stored in the memory 502. However, in other aspects, the application purchasing module 532 may be configured to allow a user to purchase mobile applications from a remote AppStore.

Further, the memory 502 may also include a social acquaintance crawling module 534. In one aspect, the social acquaintance crawling module 534 may be configured to crawl the AppStores that a user's social acquaintances are associated with to determine what applications the social acquaintance has installed and/or uninstalled in the past. In another aspect, the social acquaintance crawling module 534 may be configured to crawl a social acquaintance's public comments, reviews, and/or blog posts. Still, in other aspects, the social acquaintance crawling module 534 may configured to crawl a social acquaintance's device to determine what applications the social acquaintance has installed and/or uninstalled on the device in the past. As discussed above, this information may be used to aid in filtering and/or ranking of a user's query results.

The memory 502 may also include a search engine module 536 for receiving queries pertaining to mobile or other applications. In one example, the application store crawling module 518 may crawl application stores based at least in part on the query. In some instances, the query may be received from a user.

Illustrative methods and systems of an application store tastemaker recommendation system are described above. Some or all of these systems and methods may, but need not, be implemented at least partially by an architecture such as that shown in FIG. 4.

CONCLUSION

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A computer-implemented method comprising:
performed by one or more processors executing computer-readable instructions:
receiving a request to search for a mobile application available in a mobile application store;
determining a collection of available mobile applications based at least in part on the search;
determining a social acquaintance of a user;
querying a mobile application store of the social acquaintance of the user for mobile applications purchased for and/or previously installed on the device of the social acquaintance;
filtering the collection of available mobile applications based at least in part whether an application that is determined to be in the collection of available mobile applications has been at least one of purchased for or previously installed on the device of the social acquaintance of the user;
determining whether the acquaintance of the user is a tastemaker; and
if the acquaintance is determined to be a tastemaker:
collecting data from the tastemaker;
ranking the filtered collection of available mobile applications based at least in part on the data collected from the tastemaker; and
displaying the ranked collection of available mobile applications to the user; and
if the acquaintance is determined not to be a tastemaker:
receiving an indication to search for one or more tastemakers from among the user's acquaintances or acquaintances of the user's acquaintances.

2. The computer-implemented method of claim 1, wherein the determining of whether the acquaintance of the user is a tastemaker is based at least in part on an indication from the user, or is based at least in part on data collected about whether the acquaintance has at least one of purchased, installed, written reviews about, or answered polls about a mobile application, and wherein the tastemaker comprises a user with perceived expertise regarding mobile applications.

3. The computer-implemented method of claim 1, further comprising: creating a poll regarding the collection of available mobile applications;
providing the poll to the tastemaker or a social acquaintance of the tastemaker;
receiving an answered poll; and
storing the answered poll in a publicly accessible server.

4. The computer-implemented method of claim 3, wherein at least one of the filtering of the collection of available mobile applications or the ranking of the filtered collection is further based at least in part on the answered poll.

5. The computer-implemented method of claim 1, further comprising receiving a review associated with the application determined to be in the collection of available mobile applications, and wherein at least one of the filtering of the collection of available mobile applications or the ranking of the filtered collection is further based at least in part on the review.

6. The computer-implemented method of claim 1, further comprising recursively determining tastemakers of tastemakers by determining that an acquaintance of a tastemaker is a tastemaker based at least in part on an indication from the user or the tastemaker, or based at least in part on data collected about whether the acquaintance of the tastemaker has at least one of purchased, installed, written reviews about, or answered polls about a mobile application.

7. The computer-implemented method of claim 1, wherein the data collected from the tastemaker comprises at least one of poll question answers, mobile application reviews, user reviews of a tastemaker's advice, applications the tastemaker has purchased, installed or uninstalled on a device of the tastemaker, whether others have followed the tastemaker's advice, one or more devices, categories of devices, categories of mobile applications, technologies about which the tastemaker is an expert, or a number of tastemakers that the tastemaker knows.

8. One or more computer-readable media devices storing instructions that, when executed, configure one or more processors to perform acts comprising:
receiving a request to search for a mobile application available in a mobile application store;
determining a collection of available mobile applications based at least in part on the search;
determining a social acquaintance of a user;
querying a mobile application store of the social acquaintance of the user for mobile applications purchased for and/or previously installed on the device of the social acquaintance;
filtering the collection of available mobile applications based at least in part whether an application that is determined to be in the collection of available mobile applications has been at least one of purchased for or previously installed on the device of the social acquaintance of the user;
determining whether the acquaintance of the user is a tastemaker; and
if the acquaintance is determined to be a tastemaker:
collecting data from the tastemaker;
ranking the filtered collection of available mobile applications based at least in part on the data collected from the tastemaker; and
displaying the ranked collection of available mobile applications to the user; and
if the acquaintance is determined not to be a tastemaker:
receiving an indication to search for one or more tastemakers from among the user's acquaintances or acquaintances of the user's acquaintances.

9. The one or more computer-readable media devices of claim 8, wherein the determining of whether the acquaintance of the user is a tastemaker is based at least in part on an indication from the user, or is based at least in part on data collected about whether the acquaintance has at least one of purchased, installed, written reviews about, or answered polls about a mobile application, and wherein the tastemaker comprises a user with perceived expertise regarding mobile applications.

10. The one or more computer-readable media devices of claim 8, the acts further comprising:
creating a poll regarding the collection of available mobile applications;
providing the poll to the tastemaker or a social acquaintance of the tastemaker;
receiving an answered poll; and
storing the answered poll in a publicly accessible server.

11. The one or more computer-readable media devices of claim 8, wherein at least one of the filtering of the collection of available mobile applications and/or the ranking of the filtered collection is further based at least in part on the answered poll.

12. The one or more computer-readable media devices of claim 8, the acts further comprising receiving a review associated with the application determined to be in the collection of available mobile applications, and wherein at least one of the filtering of the collection of available mobile applications or the ranking of the filtered collection is further based at least in part on the review.

13. The one or more computer-readable media devices of claim 8, the acts further comprising recursively determining tastemakers of tastemakers by determining that an acquaintance of a tastemaker is a tastemaker based at least in part on an indication from the user or the tastemaker, or based at least in part on data collected about whether the acquaintance of the tastemaker has at least one of purchased, installed, written reviews about, or answered polls about a mobile application.

14. The one or more computer-readable media devices of claim 8, wherein the data collected from the tastemaker comprises at least one of poll question answers, mobile application reviews, user reviews of a tastemaker's advice, applications the tastemaker has purchased, installed or uninstalled on a device of the tastemaker, whether others have followed the tastemaker's advice, one or more devices, categories of devices, categories of mobile applications, technologies about which the tastemaker is an expert, or a number of tastemakers that the tastemaker knows.

15. A system comprising:
   one or more processors and memory, the memory storing one or more modules executable by the one or more processors to perform acts comprising:
   receiving a request to search for a mobile application available in a mobile application store;
   determining a collection of available mobile applications based at least in part on the search;
   determining a social acquaintance of a user;
   querying a mobile application store of the social acquaintance of the user for mobile applications purchased for and/or previously installed on the device of the social acquaintance;
   filtering the collection of available mobile applications based at least in part whether an application that is determined to be in the collection of available mobile applications has been at least one of purchased for or previously installed on the device of the social acquaintance of the user;
   determining whether the acquaintance of the user is a tastemaker; and
   if the acquaintance is determined to be a tastemaker:
      collecting data from the tastemaker;
      ranking the filtered collection of available mobile applications based at least in part on the data collected from the tastemaker; and
      displaying the ranked collection of available mobile applications to the user; and
   if the acquaintance is determined not to be a tastemaker:
      receiving an indication to search for one or more tastemakers from among the user's acquaintances or acquaintances of the user's acquaintances.

16. The system of claim 15, wherein the determining of whether the acquaintance of the user is a tastemaker is based at least in part on an indication from the user, or is based at least in part on data collected about whether the acquaintance has at least one of purchased, installed, written reviews about, and/or answered polls about a mobile application, and wherein the tastemaker comprises a user with perceived expertise regarding mobile applications.

17. The system of claim 15, the acts further comprising:
   creating a poll regarding the collection of available mobile applications;
   providing the poll to the tastemaker or a social acquaintance of the tastemaker;
   receiving an answered poll; and
   storing the answered poll in a publicly accessible server.

18. The system of claim 15, wherein at least one of the filtering of the collection of available mobile applications or the ranking of the filtered collection is further based at least in part on the answered poll.

19. The system of claim 15, the acts further comprising receiving a review associated with the application determined to be in the collection of available mobile applications, and wherein at least one of the filtering of the collection of available mobile applications or the ranking of the filtered collection is further based at least in part on the review.

20. The system of claim 15, the acts further comprising recursively determining tastemakers of tastemakers by determining that an acquaintance of a tastemaker is a tastemaker based at least in part on an indication from the user or the tastemaker, or based at least in part on data collected about whether the acquaintance of the tastemaker has at least one of purchased, installed, written reviews about, or answered polls about a mobile application.

* * * * *